United States Patent
Cazanas et al.

(10) Patent No.: US 8,842,016 B1
(45) Date of Patent: Sep. 23, 2014

(54) FIRE EXTINGUISHER NOTIFICATION SYSTEM AND METHOD OF USE

(75) Inventors: Carlos A. Cazanas, Bethlehem, PA (US); Azam Khan, Franklin Park, NJ (US); Terence John Sullivan, Pequannock, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 182 days.

(21) Appl. No.: 13/225,941

(22) Filed: Sep. 6, 2011

(51) Int. Cl.
*G08B 25/00* (2006.01)

(52) U.S. Cl.
USPC .............. 340/611; 340/568.8; 340/539.1; 340/612; 340/614; 340/629; 42/70.06; 42/70.07; 455/456.3; 169/60; 169/61; 169/63

(58) Field of Classification Search
USPC .......... 340/568.8, 539.1, 612, 614, 615, 626, 340/669, 686.1, 686.6; 42/70.06, 70.7; 169/60, 63, 61, 71, 75, 76; 455/456.3, 455/453.6
See application file for complete search history.

(56) References Cited

U.S. PATENT DOCUMENTS

| | | | |
|---|---|---|---|
| 7,182,144 B2 * | 2/2007 | Baba et al. | 169/52 |
| 7,191,964 B2 * | 3/2007 | Trapp | 239/587.2 |
| 7,726,411 B2 * | 6/2010 | McSheffrey et al. | 169/75 |
| 7,728,715 B2 * | 6/2010 | Riedel et al. | 340/286.05 |
| 7,945,414 B2 * | 5/2011 | Nagase et al. | 702/114 |
| 2005/0006109 A1 * | 1/2005 | McSheffrey et al. | 169/75 |
| 2006/0283608 A1 * | 12/2006 | Hauck | 169/30 |
| 2008/0000649 A1 * | 1/2008 | Guirguis et al. | 169/60 |
| 2010/0283600 A1 * | 11/2010 | Herbert et al. | 340/539.1 |
| 2011/0025491 A1 | 2/2011 | Cazanas et al. | |

* cited by examiner

*Primary Examiner* — Daniel Wu
*Assistant Examiner* — Benyam Haile

(57) ABSTRACT

A system for notifying when a fire extinguisher is discharged or moved uses a device mounted on the fire extinguisher for monitoring one or more conditions. For example, the device may be interconnected with a trigger detecting mechanism otherwise present on the extinguisher or sense a sudden drop in pressure to detect when the extinguisher is activated. An accelerometer may be provided to detect motion. GPS processing can identify the location of the fire extinguisher when an event occurs. When the device detects a change in one or more of the conditions, or needs to send periodic updates of the fire extinguisher conditions, a message is forwarded from the device to a third party clearinghouse via a wireless communication network. The clearinghouse reviews the data, and forwards the data, as may be appropriate, to one or more authorized parties identified in the database.

22 Claims, 6 Drawing Sheets

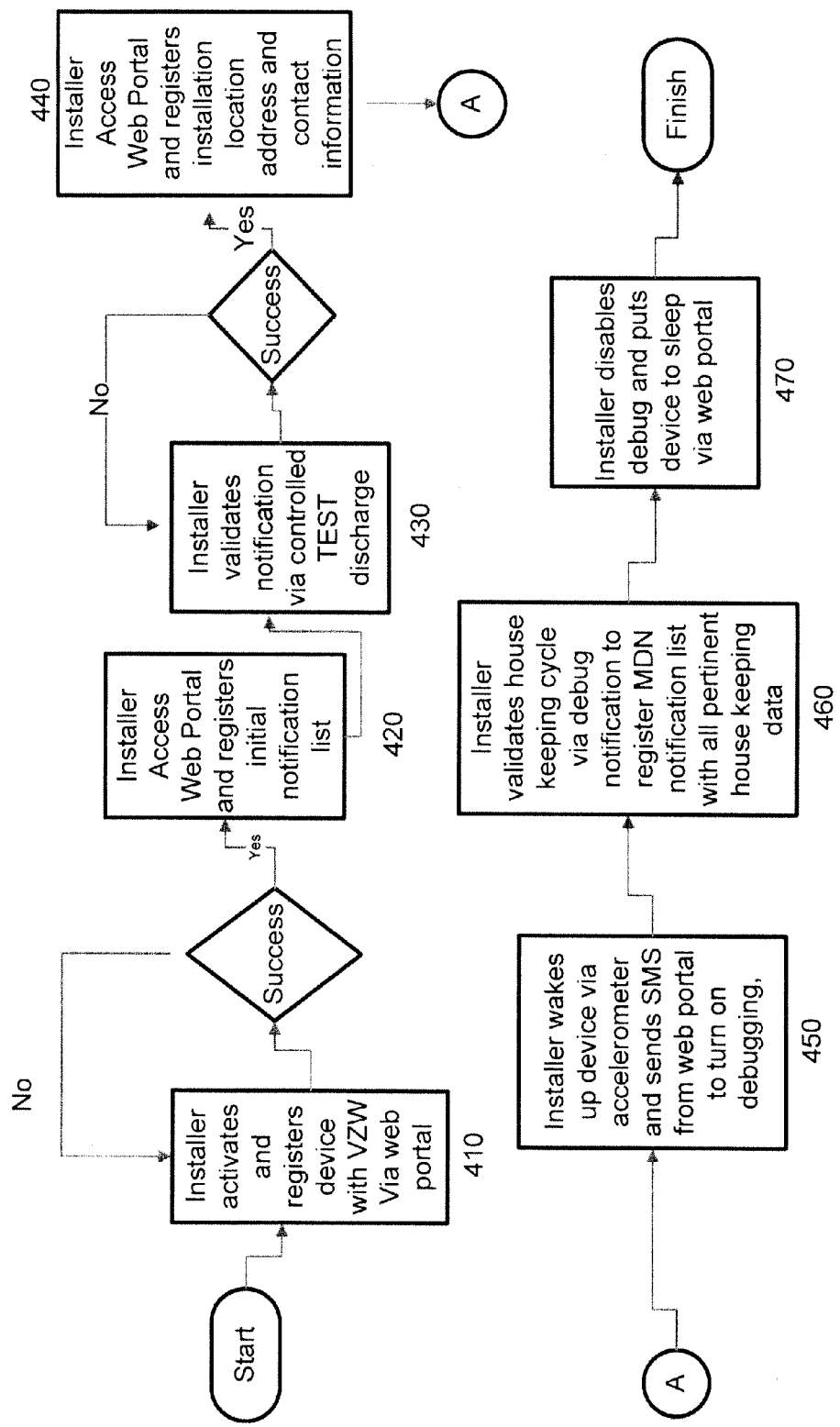

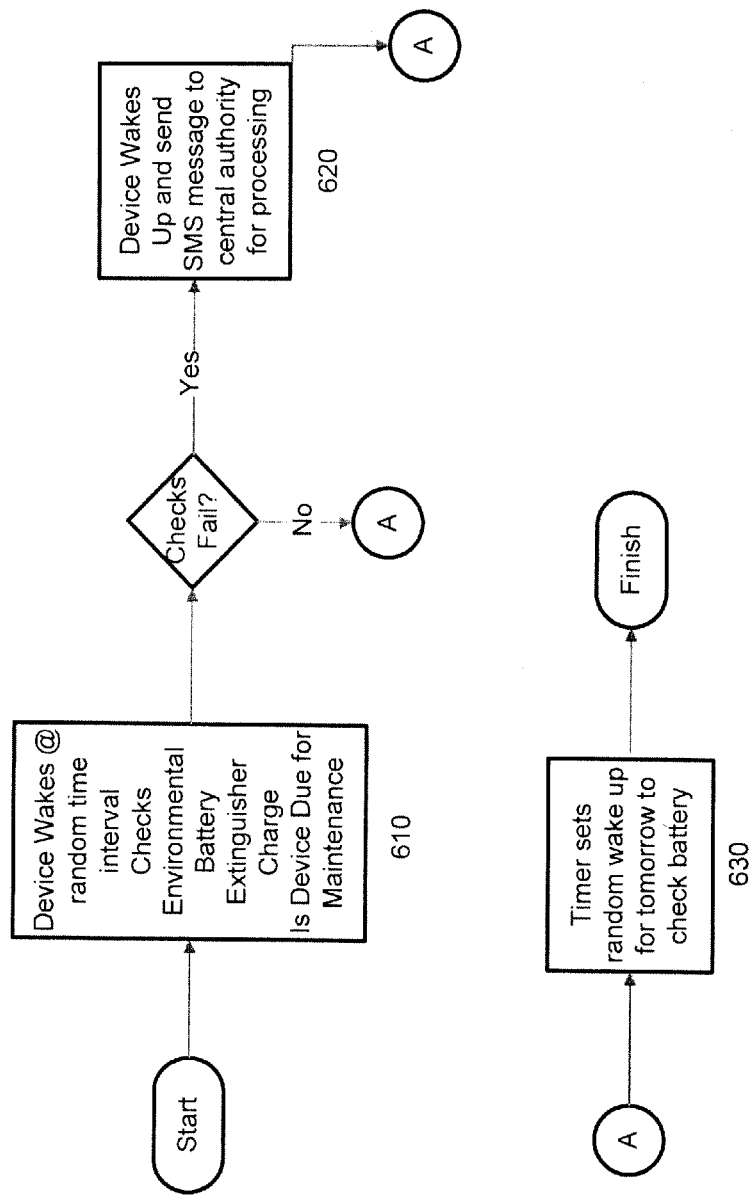

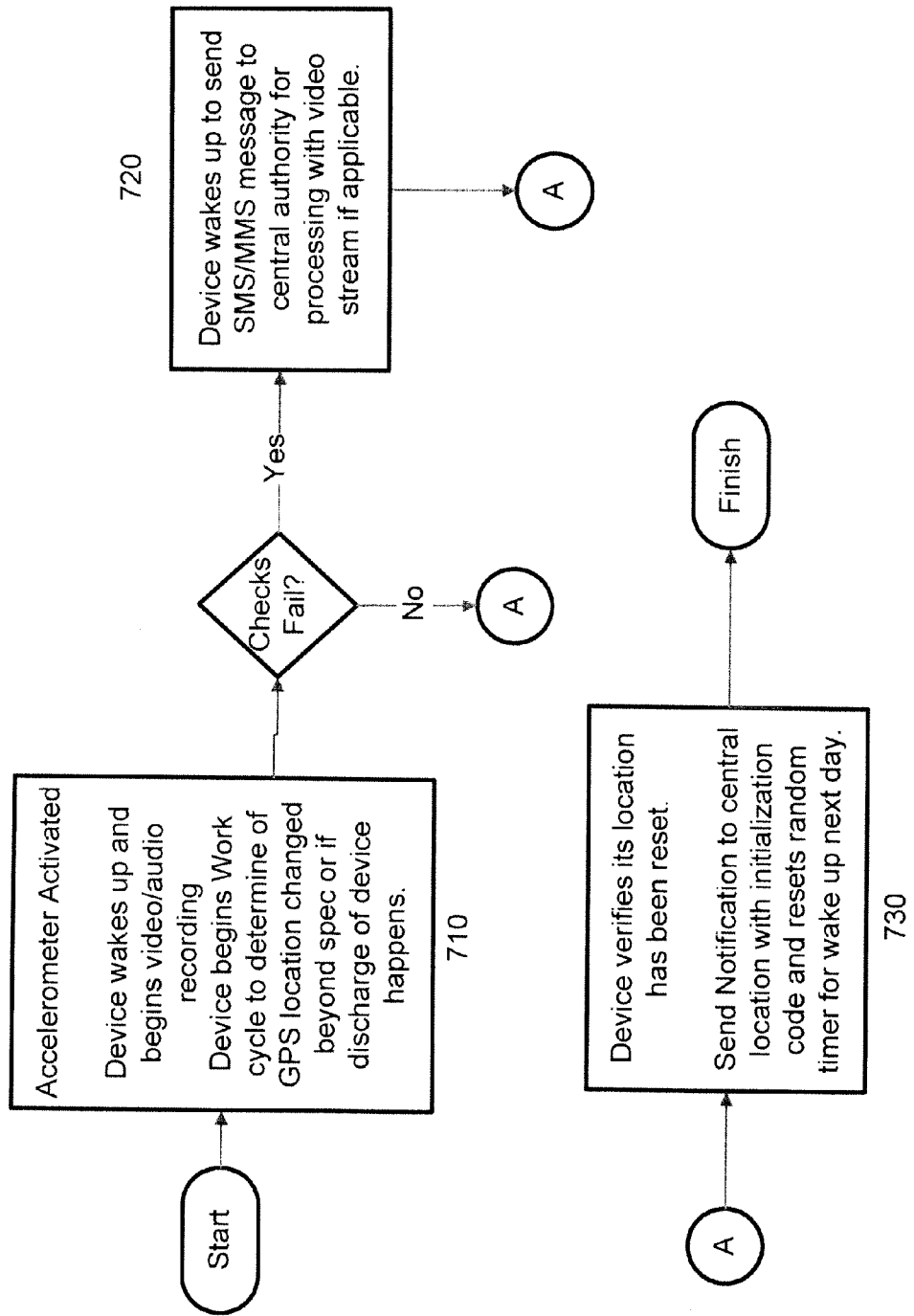

FIRE EXTINGUISHER NOTIFICATION SYSTEM AND METHOD OF USE

TECHNICAL FIELD

The present subject matter relates to providing notification to an authorized party of a condition or change of condition of a fire extinguisher via wireless communication.

BACKGROUND

Fire extinguishers are life saving devices that are both efficient at issuing a strong stream of fire extinguishing material and easy to activate and use. These two characteristics have resulted in fire extinguishers being extremely widespread through out the world as a leading first line defense against fires. However, the ease of use and wide spread proliferation of fire extinguishers has its drawbacks, such as the unauthorized activation of fire extinguishers. This unauthorized use of fire extinguishers results in millions of dollars of waste per year.

A need exists for a way to monitor a fire extinguisher, e.g., to detect when the fire extinguisher is used or moved, and to transmit reporting information.

SUMMARY

The teachings herein alleviate one or more of the above noted problems by providing an improvement in the form of a system for notifying when a fire extinguisher is discharged or moved, or the like. The system uses a device associated with the fire extinguisher for monitoring one or more conditions.

Examples of monitored conditions include the pressure inside the fire extinguisher, the location of the fire extinguisher, movement of the fire extinguisher, or the activation of a triggering mechanism, such as a pin, key, or handle, etc. In the disclosed examples, the device can be interconnected with a sensor otherwise present on the extinguisher (e.g., pressure gauge, triggering mechanism), and configured for detecting when the extinguisher is activated. Pressure sensing over a long interval may indicate a slow drop in pressure requiring a recharge and/or repair. An accelerometer can determine movement of the fire extinguisher. Global Positioning System (GPS) processing can identify the location of the fire extinguisher when an event occurs.

When the exemplary device detects a change in one or more of the conditions that meets one or more report criteria, a message is forwarded from the device, e.g., to a third party clearinghouse. Exemplary methods use Short Messaging Service (SMS) notifications, Multimedia Messaging Service (MMS) notifications, or IP data, although the notification can be sent by any means available. A wireless communication network is used. The type of communication is not restricted; for example, short or long range communication systems such as Bluetooth, WiFi, LTE, 4G, 3G may be used. The device can also use the messaging system to send periodic updates of the fire extinguisher conditions for maintenance purposes.

After receiving the notification data, the clearinghouse reviews the data, compares the data to information unique to the fire extinguisher in a database. This information includes the location of the installation of the fire extinguisher, a unique ID number of the extinguisher, the last maintenance check of the fire extinguisher, the age of the fire extinguisher, and the like. The message is then forwarded to one or more authorized parties identified in the database. The message provides details regarding the current condition of the fire extinguisher, such as the location of the fire extinguisher when it was activated, and when the fire extinguisher was activated. The authorized parties may then choose to investigate the scene based on the location of the fire extinguisher based on the location data.

Optional features of the system include a camera which can record images from the extinguisher when the extinguisher is activated. The camera can take one or more images, over a period of time, or record video to help the authorized parties determine the nature of the activation and whether or not the activation was warranted by emergency, or if unauthorized use of the fire extinguisher occurred. Another optional feature includes a microphone which can record sound, and act in a similar manner to the camera to provide information about the activation of the fire extinguisher.

The device can be operated by any available power source, such as a battery. The battery is checked periodically. The device can also use the messaging system to report if the battery power is low.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 4 is a flow chart illustrating one embodiment of device setup;

FIG. 6 is a flow chart illustrating one embodiment of a check routine for the device; and FIG. 7 is a flow chart illustrating one embodiment of activation of the accelerometer of the device.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Reference now is made in detail to the examples illustrated in the accompanying drawings and discussed below.

A fire extinguisher is equipped with a monitoring and communication device (also referred to as a notification device) to provide the capability of wireless communication, for example, for transmitting SMS or MMS messages. The notification device contains one or more status or condition sensors installed in association with the extinguisher. In a specific example, a sensor to detect a fire extinguisher discharge is installed on the fire extinguisher. A motion detector, such as an accelerometer may also be provided. The fire extinguisher device also has a capability to receive Global Positioning System (GPS) signals from GPS satellites. When a sensed condition meets one or more report criteria, a notification is generated and sent through a wireless network.

Examples of sensed conditions include the pressure inside the fire extinguisher, the location of the fire extinguisher, movement of the fire extinguisher, or the activation of a triggering mechanism, such as a pin, key, or handle, etc. For example, when one of the sensors installed in the fire extinguisher detects that the fire extinguisher has been discharged, the notification device generates and transmits a message indicating occurrence of the fire extinguisher discharge and GPS data (or other data from which the location of the fire extinguisher may be determined) to a third party clearinghouse via a wireless communication network. Alternatively, the notification device itself may calculate its location based on the GPS signals and send a message indicating occurrence of the fire extinguisher discharge as well as the actual current location of the fire extinguisher, a unique ID number of the extinguisher, the last maintenance check of the fire extinguisher, the age of the fire extinguisher, and the like. If one of the sensors is a motion detector, a similar message is sent when movement of the extinguisher is detected, e.g. before a discharge, other sensing and reporting may be provided, e.g., to facilitate maintenance and/or to provide additional information relevant to reported events.

Figure 1:
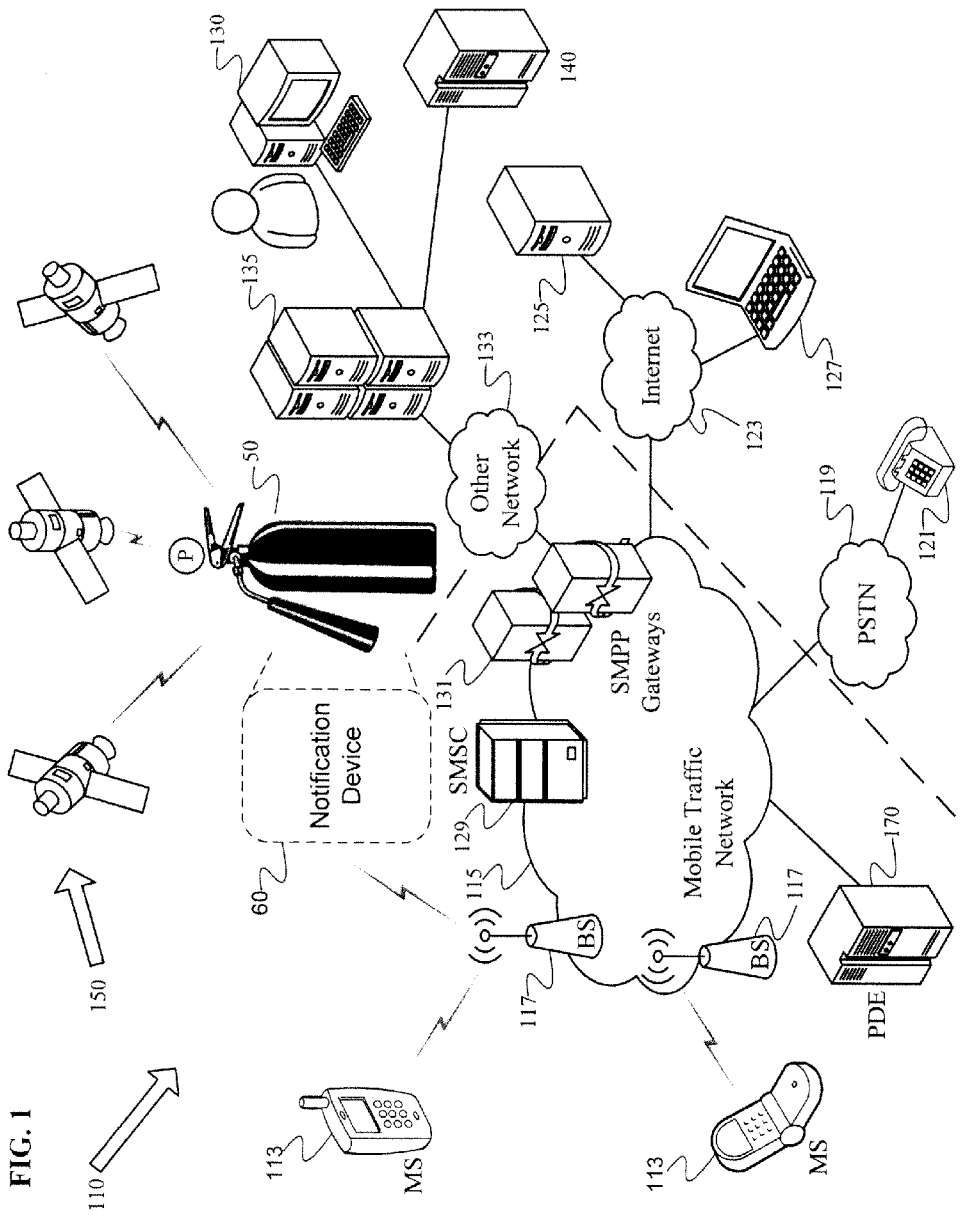
FIG. 1 illustrates a system for notifying a clearinghouse of the discharging of a fire extinguisher via a wireless communication link.

FIG. 1 illustrates one embodiment of a system for providing notice of a condition of a fire extinguisher to a third party clearinghouse via a wireless communication link.

In one example, the system operates by determining if the sensed condition of the fire extinguisher meets one or more report criteria. To meet one of the report criteria, the condition must be one which is predetermined to report, according to the requirements defined by the user of the service.

When the sensed condition of the fire extinguisher is determined to meet one of the report criteria, processing of signals is initiated, e.g., through a GPS receiver to obtain information identifying a current location of the fire extinguisher.

A notification message is then generated containing an identification of the fire extinguisher and the information identifying the current location of the fire extinguisher. The message may also include data about the condition as currently sensed by the sensor, e.g. pressure, movement or discharge. A wireless communication transmitter is then operated to send the notification message through a wireless communication network addressed for delivery to a predetermined destination, the clearing house in our example. The device may also use a base station (not shown), which provides CDMA call coverage for areas that high capacity CDMA MACRO BTS cannot handle such as dead spots in homes and indoor environments as well as areas where radio waves are weak in order to send the notification message to the third party.

The network 110 often (but not always) comprises individual networks operated by a number of different mobile communication service providers, carriers or operators; although for simplicity of discussion the network 110 is assumed to be a network operated by one carrier. The communication network 110 provides mobile voice telephone communications as well as other services such as text messaging and various multimedia messaging and packet data services, for numerous mobile devices. One type of mobile device shown in the drawing is users' mobile stations 113. The network supports a variety of application services, using mobile network messaging services as the transport mechanism, where application servers/service providers offer application services typically identified by short codes. For purposes of the present discussion, the drawings show an example in which the application service relates to a notification service of a sensed fire extinguisher condition. Hence, FIG. 1 shows a fire extinguisher 50 equipped with a notification device 60. The fire extinguisher 50 has capabilities to communicate via the wireless mobile communication network 110 and to receive Global Positioning System (GPS) signals from GPS satellites 150.

In normal operation, the network 110 allows the mobile stations 113 that are currently operating through the network to initiate voice calls and to communicate messages to other elements connected to the wireless network 110, the internet 123, the PSTN 119 or the like. The network 110 typically offers a variety of text and other data services, including services via the Internet 123, such as downloads, web browsing, e-mail, etc. via servers shown generally at 125 as well as message communications with terminal devices represented generally by the personal computer (PC) 127.

A number of the data services provide messaging services. Examples of such services include SMS, EMS (Enhanced Messaging Service) and MMS. Although the present teachings may be applied to any of these or other types of messaging services, for purposes of a specific example to discuss here, we will assume that the network 110 allows SMS type text messaging and MMS type multimedia messaging between mobile stations 113 and similar messaging with other devices, e.g. via the Internet 123.

A first simple example provides discharge notification only, thereby using minimal data in a discharge message and providing further notification in a separate message associated with the discharge message. SMS messaging can be used for notification transport in such an example. Hence, at least the SMS service is also available, as needed, to the notification device 60 in the fire extinguisher 50. The communication elements and location elements of the circuitry associated with the notification device 60 within the fire extinguisher 50 are generally similar to corresponding elements of a regular mobile station 113. To the wireless mobile communication network 110, the notification device 60 installed on each fire extinguisher 50 is provisioned and operates in a manner generally similar to a mobile station (MS) 113, although the network services available to the notification device 60 may be somewhat limited in comparison to those available to various mobile stations 113. For example, the notification device 60 may be provisioned only to send/receive SMS type messaging communications to/from call center(s) or the like of a security or other monitoring service provider(s).

The network 110 may implement wireless communications with the mobile stations 113 (and a similar notification device 60 on the fire extinguisher 50) via any of a variety of different standard communication technologies common in public wireless mobile communication networks. Examples of such technologies include various CDMA standards, including 3GPP2 variants thereof (e.g. 1XRTT or EVDO), as well as TDMA and GSM standards including 3GPP variants (e.g. LTE or UMTS). The mobile stations 113 and the communications elements of the notification device 60 for the fire extinguisher 50 would be configured to communicate in accord with the wireless standard supported by the network 110, although many mobile devices have the capability of communicating via a number of networks that may utilize different standardized technologies (multi-mode devices); and the notification device 60 may similarly have multi-mode communication capabilities.

The mobile communication network 110 typically is implemented by a number of interconnected networks. Hence, the overall network 110 may include a number of radio access networks (RANs), as well as regional ground networks interconnecting a number of RANs and a wide area network (WAN) interconnecting the regional ground networks to core network elements, such as SMS messaging centers (SMSCs) 129 and/or multimedia messaging centers (MMSCs—not shown). A regional portion of the network 110, such as that serving mobile stations 113 and the fire extinguisher 50 will typically include one or more RANs and a regional circuit and/or packet switched network and associated signaling network facilities.

Physical elements of a RAN operated by one of the mobile service providers or carriers include a number of base stations represented in the example by the base stations 117. Although not separately shown, such a base station (BS) 117 typically comprises a base transceiver system (BTS) which communicates via an antenna system at the site of the base station and over the airlink with one or more of the mobile devices 113 or the notification device 60 in the fire extinguisher 50, when the mobile devices are within range. Each base station (BS) 117 typically includes a BTS coupled to several antennas mounted on a radio tower within a coverage area often referred to as a "cell." The BTS is the part of the radio network that sends and receives RF signals to/from the mobile devices that the base station currently serves.

The radio access networks also include or connect to a traffic network represented generally by the cloud shown at 115, which carries the user communications for the mobile stations 113 and the fire extinguisher 50 between the base stations 117 and other elements with or through which the various wireless mobile devices communicate. Individual elements such as switches and/or routers forming the traffic network 115 are omitted here for simplicity.

The traffic network portion 115 of the mobile communication network 110 connects to the public switched telephone network (PSTN) 119. This allows the network 110 to provide voice grade call connections between mobile stations 113 and regular telephones connected to the PSTN 119. The drawing shows one such telephone at 121. This interconnection supports regular voice telephone traffic of the mobile stations 113 as well as voice communications for the personnel at monitored locations, for example, with telephone equipment (not shown) at one or more call centers of the agencies or companies providing the fire-related monitoring application service.

The traffic network portion 115 of the mobile communication network 110 connects to a public packet switched data communication network, such as the network commonly referred to as the "Internet" shown at 123. As noted earlier, packet switched communications via the traffic network 115 and the Internet 123 may support a variety of user services through the network 110, such as mobile station communications of text and multimedia messages, e-mail, web surfing or browsing, programming and media downloading, etc. For example, the mobile stations 113 may be able to receive messages from and send messages to user terminal devices, such as personal computers, either directly (peer-to-peer) or via various servers. The drawing shows one such user terminal device as a personal computer (PC) at 127 and one server 125, by way of example. Although a different approach is illustrated, the messaging for the fire extinguisher 50 could go via the Internet 123.

For purposes of the discussion of handling of messaging traffic related to fire extinguisher monitoring, we will initially concentrate on an SMS type implementation of the messaging service that carries or transports the data portion of the fire extinguisher related application service communications through the network 110. Those skilled in the art will recognize, however, that the fire extinguisher reporting service may utilize other types of the messaging services available in the typical wireless mobile communication network 110, and that the present concepts are equally applicable to the reporting services using those other types of messaging services through the network. For example, a later implementation providing an image and/or audio with a notification may use IP message transport or MMS message transport.

Wireless carriers developed the Short Messaging Service (SMS) to transmit text messages for display on the mobile stations. In many existing network architectures, the SMS traffic uses the signaling portion of the network 115 to carry message traffic between a Short Message Service Center (SMSC) 129 and the mobile stations 113. The SMSC 129 supports mobile station to mobile station delivery of text messages. However, the SMSC 129 also supports communication of messages between the mobile stations and devices coupled to other networks. For example, the SMSC 129 may receive incoming IP message packets from the Internet 123 for delivery via the network 115, one of the base stations 117 and a signaling channel over the air link to a destination mobile station 113. For this later type of SMS related communications, the network 110 also includes one or more Short Messaging Peer-to-Peer (SMPP) protocol gateways 131. The SMPP gateway 131 provides protocol conversions, between SMPP as used by the SMSC 129 and the protocols used on the Internet 123 or other IP network 133. SMPP messages ride on IP transport, e.g. between the gateway 131 and the SMSC 129. MMSCs (not shown) function in a manner similar to SMSCs, but handle multimedia messages instead of short text messages.

The exemplary system also includes one or more other packet communication networks 133 connected to the mobile network 110. The other packet communication network 133 may be a private packet data network operated by the same carrier that operates network 110 for its own purposes, or the other packet communication network 133 may be a secure network interconnected among several parties working together to provide certain secure services. Alternatively, the other packet communication network 133 may be the Internet 123. In the example, the other packet communication network 133 provides packet data communications between the gateway (GW) 131 and the traffic network 115, for a number of application servers. Of note for purposes of this discussion of fire extinguisher monitoring and reporting, one such application server 135 is designed specifically to function as a clearinghouse to process SMS messages from fire extinguishers 50 and provide the messages to one or more associated third party terminals 130. The clearinghouse has software designed for the handling of the notification from the fire extinguisher 50. The notification from the clearinghouse can be subsequently processed by another party message processor to further tailor the message for specific users.

Programming for the processor of the server 135 configures the server 135 to receive a notification message sent from a notification device 60 for an associated fire extinguisher 50 for which a sensed condition that meets one or more of the report criteria triggered the notification message, through the wireless communication network 115. The received notification message may contain various pieces of information. The information will be dependent upon the requirements provided by the notification party. For example, the content in the notification message may include an identification of the fire extinguisher and information identifying current location of the fire extinguisher, the mobile number associated with the device, and the notification may contain data about the condition as currently sensed by a sensor associated with the notification device, such as the internal pressure of the fire extinguisher and the temperature, as well as the battery level of the device 60.

The clearinghouse 135 analyzes the message and determines how to proceed, for example, to identify one or more parties who should learn of the notification. A database 140 is accessed to identify a party authorized to receive notice about the fire extinguisher 50 for which the sensed condition triggered the notification message. At least some information from the received notification message is then sent through a communication network to equipment of the identified authorized party.

A third party terminal 130 receives the SMS message (or another type of message carrying content of information derived from the SMS message) sent from the fire extinguisher 50, such as notification of the fire extinguisher 50 discharge and/or location of the fire extinguisher 50. The third party terminal 130 may be a device closely associated with the server 135, as shown, PC 127, which receives a message converted from the SMS message, or telephone 121, which receives a voice call converted from the SMS message (e.g., a standard automated phone message with information from the SMS message inserted into the appropriate portion of the phone message). Alternatively, the third party terminal 130 may be a mobile terminal 113 selected to receive the SMS message directly from the fire extinguisher 50 without having the SMS message go through the clearinghouse 135.

The clearinghouse server 135 can distribute a notification to terminals 130 of any number of people or entities who may be designated to receive the fire extinguisher notification. For example, notification may be provided to personnel of a company that installed and maintains the extinguisher(s) at a particular premise. Notification may also be provided to building maintenance and/or management personnel, to personnel of one or more tenants, to emergency response personnel (e.g., fire department and/or police), etc. These entities will receive discharge information only, as the clearinghouse will receive the house keeping events, such as battery level and maintenance information. After the device is used/discharged, a SMS notification is generated to the clearinghouse. The clearinghouse can then inform a servicing facility to get the notification device 60 and fire extinguisher 50 for recharging and initializing.

To avoid multiple similar messages from the same fire extinguisher, in one embodiment the notification device 60 provides a beacon signal of its position every 5 seconds if its GPS location has changed. The beacon signal continues up the to point the notification device 60 is used or the fire extinguisher 50 is discharged. If the notification device and fire extinguisher is not used/discharged, the beacon signal terminates once accelerometer triggering by the accelerometer stops and GPS location updates determine no movement.

Figure 2:
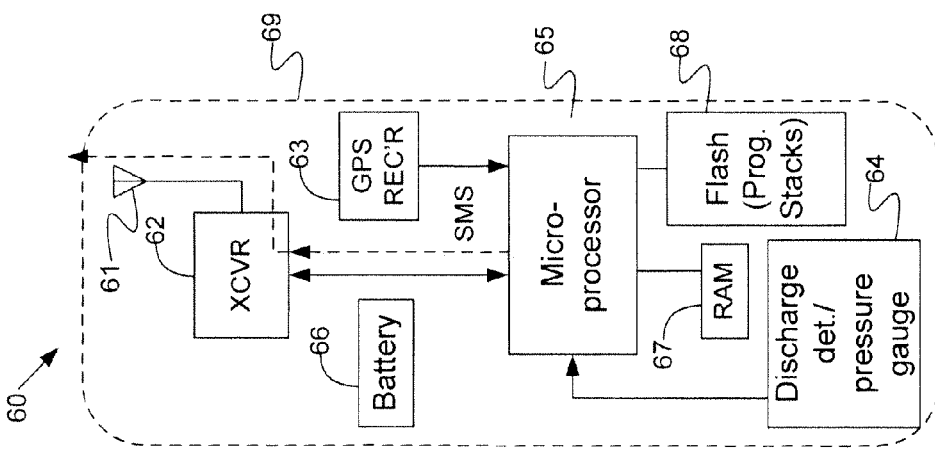
FIG. 2 illustrates a device for attaching to a fire extinguisher for notifying a clearinghouse of the discharging of the fire extinguisher.

FIG. 2 is a schematic diagram of the circuitry of the notification device 60 to implement functional elements for monitoring and for notifying a third party clearinghouse of a sensed condition of a fire extinguisher. The present discussion of message handling focuses on the message processing, that is to say the processing of the SMS messages from the notification device 60 of one fire extinguisher 50. The notification device 60 may be equipped inside relatively stable areas in or on the fire extinguisher 50, for example, inside or adjacent to the handle.

The notification device 60 includes a digital transceiver (XCVR) 62, in this case, compatible with digital wireless communications with the base station 117 (FIG. 1) or nearby repeaters. The concepts discussed here encompass any digital transceivers that conform to current or future developed digital wireless communication standards. For example, the transceiver 62 could be a CDMA-2000, 1xRTT, EVDO or LTE unit or the like designed for cellular or PCS operation or a transceiver for WiFi/WLAN type operation. The transceiver 62 provides two-way wireless communication of information, such as digital message information. If compatible with the base station 117, the communications via the transceiver could include transmission and reception of SMS messages. In our present example, via the base station 117, the communications via the transceiver 62 utilize SMS message services. The transceiver also sends and receives a variety of signaling messages via the network, e.g., to establish and maintain network registration. The transceiver 62 connects through RF send and receive amplifiers (not separately shown) to an antenna 61. The circuit 60 may include one or more additional transceivers (not shown) for operation in accord with an alternative digital standard. The IP packet transport can be used instead of the SMS messages as a way to communicate with the base station 117.

In this example, a discharge detector 64 detects when the fire extinguisher 50 is discharged. The discharge detector 64 may be a trigger in a handle, or a sensor or switch responsive to trigger operation or pulling of a pin in the handle, or it may be a pressure gauge and processor function that senses a sudden drop in pressure inside the fire extinguisher 50. Pressure sensing over a long interval may also indicate a slow in pressure requiring a recharge and/or repair. For example, the device can be programmed to send notification if the pressure is reduced by a certain amount, such as 5%, 10% or 15% of the maximum.

The discharge detector 64 may be separately implemented and installed inside the fire extinguisher 50 from the rest of the circuitry of the notification device 60 to send SMS messages and obtain and forward GPS data, if the latter is present. Other types of sensors to sense movement of the fire extinguisher 50 such as a motion sensor, a thermal sensor, and/or an accelerometer may be present as opposed or in addition to the discharge detector 64.

A discharge is an example of a sensed condition that meets one of the reporting criteria. When the discharge detector 64 senses the fire extinguisher 50 discharge, e.g., by sensing a sudden pressure drop in a pressure sensing implementation, the discharge detector 64 notifies the microprocessor 65. The microprocessor 65 may wake up using standard wake up techniques and turn-on the GPS receiver 63 and the transceiver 62, which were previously dormant for saving power of the battery 66.

The GPS receiver 63 receives GPS signals from the GPS satellites 150. Each of the GPS satellites 150 continually transmits messages containing the time the message was sent, precise orbital information (the ephemeris), and the general system health and rough orbits of all GPS satellites (the almanac). The receiver 63 measures the transit time of each message as a representation of the distance to each satellite, for signals from typically 3-5 satellites. Geometric trilateration is used to combine these distances with the location of the satellites to determine the receiver's location.

If the GPS receiver 63, and/or microprocessor 65 has sufficient processing capabilities, for example, the notification device 60 calculates its position by timing from the measuring of the signals received from the GPS satellites 150. The GPS receiver 63 sends its calculated position data to the microprocessor 65, which serves as an SMS message generator.

Alternatively, the GPS receiver 63 may send the message containing the satellite identifications and transit time measurements, as location related data, to the mobile network 115 and a Position Determining Equipment (PDE) 170 with location decision capabilities. In this latter example, the PDE 170 processes the raw data from the notification device 60 to calculate the location of the fire extinguisher 50. The PDE 170 is essentially a general purpose programmable device with an interface for data communication via the network 115 running server software and running programming for implementation of the PDE 170 functions. The PDE 170 stores (e.g. in cache memory) or has access to a complete and up to date set of the satellite data for the constellation of GPS satellites needed to allow computation of position based on pseudo range measurements from satellite signals as received from the fire extinguisher 50 or from other mobile devices. In this example, the PDE 170 would send back the latitude and longitude of the determined position to the microprocessor 65 in the notification device 60. In either implementation, the microprocessor can include latitude and longitude data for the fire extinguisher 50 in the SMS type discharge notification message.

In another embodiment, GPS data may not be used (and thus the GPS receiver 63 may not be present). In such an embodiment, the notification device 60 may rely on location information determined by another electronic device with which it communicates. For example, if the notification device 60 communicates through a repeater or router, the identity of the repeater or router may be used. Alternatively, RFID tags may be distributed in fixed locations near the area in which the fire extinguisher 50 is disposed and the notification device 60 may communicate with a local RFID tag whose location is known (e.g., on a wall, an exit sign). In either location, the identity of the device itself, whose location is fixed or otherwise predetermined, may be used to substitute for GPS data in the content or header of the message from the notification device 60 or in a supplemental message associated with the message from the notification device 60.

The battery 66 is also installed in the notification device 60. During housekeeping cycles, the battery 66 can be programmed to supply power to only the accelerometer in order to save power. The microprocessor 65 may start to supply power from the battery 66 to the entire notification device 60 after detection of the fire extinguisher discharge. The microprocessor 65 controls operations of the transceiver (XCVR) 62, the GPS receiver 63 and the battery 66. The microprocessor 65, once woken up, may also perform preliminary communication control or other initial protocol procedures through the transceiver 62 to allow communication of the information to take place. A Random Memory Access (RAM) 67 and Flash Read Only Memory (ROM) 68 are coupled to the microprocessor 65 to store and retrieve any applications executed by the microprocessor 65 and hold any data processed through the microprocessor 65.

When triggered by the discharge detector 64, the microprocessor 65 generates a SMS message indicating the fire extinguisher 50 discharge based on the signal received from the discharge detector 64. The SMS message includes a device identifier (identifying the notification device 60 and thus the associated fire extinguisher 50) and, in some embodiments, the data regarding the location of the fire extinguisher 50 calculated by the GPS receiver 63 or obtained from the PDE, the satellite signal measurement data instead of the actual location of the fire extinguisher 50 (if the clearinghouse server calculates the location of the fire extinguisher 50), or other electronic device location-identifying information. In the SMS example, the generated SMS message is sent to the wireless network via the transceiver 62 and the antenna 61.

If the notification information will exceed the allowable length for SMS message, the device may send two or more such messages in sequence over a short time, e.g., with a message and/or delimitor(s) to help the server 135 re-compile the data from multiple messages. While SMS messages are primarily described as a way to inform a reporting center about the fire extinguisher discharge, other types of messages such as MMS messages and/or IP message transport may be used.

Figure 3:
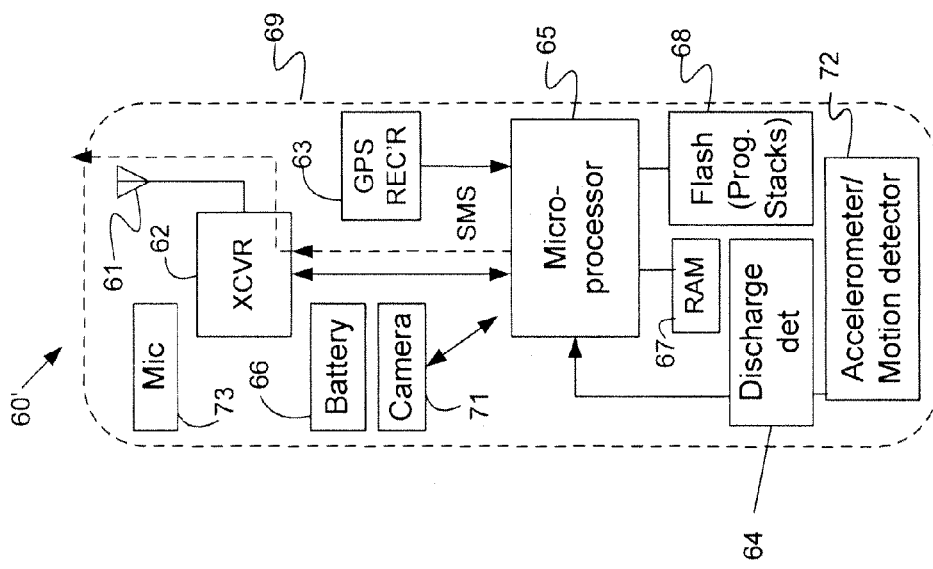
FIG. 3 illustrates another device for attaching to a fire extinguisher for notifying a clearinghouse of the discharging of the fire extinguisher and/or other conditions meeting report criteria.

FIG. 3 shows another example of the notification device 60'. In this example, the notification device 60' is equipped with both discharge detector 64 and an accelerometer 72. The accelerometer 72 measures the acceleration it experiences relative to freefall and detects magnitude and direction of the acceleration as a vector quantity. The accelerometer 72 in this example is used to detect motion, although other motion detectors may be used. Once the accelerometer 72 senses movement of the fire extinguisher 50, the accelerometer 72 and/or the microprocessor 65 determines that the movement meets the level that constitutes one of the report criteria. As with the discharge detector 64, the microprocessor 65 responds by generating a notification message identifying the fire extinguisher 50 and in some embodiments its location. In this example, each message also includes data about the sensed condition, e.g., to indicate whether a particular notification message was generated in response to a discharge or upon movement based on the signal received from the accelerometer 72.

The notification device 60' in FIG. 3 is also equipped with a camera 71. The camera is capable of recording images of the area surrounding the fire extinguisher. The camera 71 can take one or more images, over a period of time, or record video to help the authorized parties determine the nature of the activation and whether or not the activation was warranted by emergency, or if unauthorized use of the fire extinguisher occurred.

The notification device 60' can also be equipped with a microphone 73 to record sound, and act in a similar manner to the camera 71 to provide information about the activation of the fire extinguisher. When a sensed condition which meets one or more of the report criteria such as movement recorded by the accelerometer 72, or a discharge sensed by the discharge detector 64, the microprocessor 65 activates the camera 71 to record one or more images. These images and/or audio are then sent to the microprocessor 65 to generate a MMS message for sending to the clearinghouse server 135. In some examples, the camera 71 records a single picture or series of images obtained at predetermined intervals, e.g., one picture every 3, 5, 10, 15 seconds (or longer). In other examples, the camera 71 obtains video images, e.g., 24 images per second. The amount and frequency of the images and/or duration of recording sound is determined beforehand and may be dependent on the battery 66 or power left in the battery 66.

FIG. 4 is a flowchart illustrating one embodiment of the setup of the system for notifying interested parties when a sensed condition of a fire extinguisher meets one or more report criteria. When the installer installs a notification device 60 at a customer location, the device should be attached to a fire extinguisher in such a way as to prevent unauthorized removal of the device. The device can be hidden in various locations on the fire extinguisher to reduce its visibility, thereby limiting the likelihood of tampering or accidental removal.

The installer activates and registers the notification device 60 with carrier or network service provider, such as VZW, via a web portal such as the web portal 127 shown in FIG. 1. The installer then checks to see if the device is registered. If the device registration fails, the installer then attempts again to register the device 410.

Relevant data about the device is added to database 140. Upon successful registration, for example, the installer accesses the web portal 127 and registers the initial notification list 420. The initial notification list comprises the parties that the clearinghouse will notify when the fire extinguisher is activated. Generally, these parties include police, fire department, and, if known, building administrators where the fire extinguisher is installed. The database record may also specify different conditions under which the different parties should receive notices, e.g., movement instead of discharge. The installer then validates the notification system via a controlled test discharge 430. The installer assesses whether the test is successful by determining if the parties on the notification list are notified by the system. If the test is unsuccessful, the installer attempts controlled discharge again. If the test discharge does result in a successful notification, the installer then accesses the web portal 127 and registers the installation location and address, and the contact information of the installer or installation company 440.

After installation of the notification device, the installer activates, i.e., wakes up, the circuitry in the notification device 60' via the accelerometer in the example of FIG. 3, and sends an SMS from a web portal to turn on debugging programs 450. The installer then accesses the web portal 127 and has the notification device register its location through GPS or other means. The location may later be used as a basis for comparison of the location where the fire extinguisher is discharged or moved to.

The installer then validates the housekeeping cycle via a debug notification 460. Various pieces of information related to the general operability of the device are reported, for example, the location, the battery power level, etc. After validation, the installer then disables the debug notification and sets the notification device to sleep mode 470 via a web portal 127.

Figure 5:
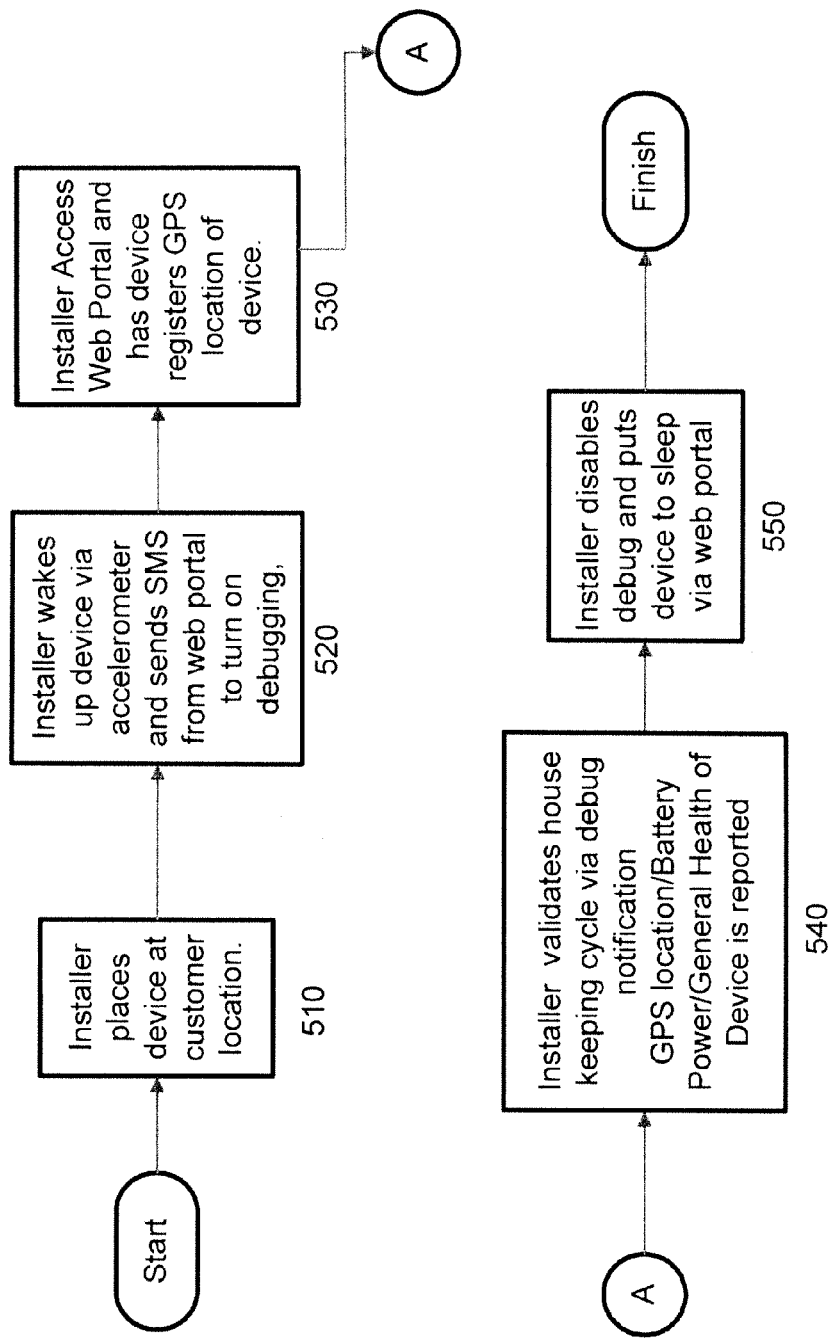
FIG. 5 is a flow chart illustrating one embodiment of device installation.

FIG. 5 is a flowchart illustrating one embodiment of the installation of the system for notifying interested parties when a sensed condition of a fire extinguisher meets one or more report criteria. After setup, which can take place at the installation location or elsewhere, the installer installs the notification device at the customer location 510. The installer then wakes up the notification device by triggering one or more of the reporting criteria, such as movement via the accelerometer. A SMS is then sent from the web portal 127 to turn on the debugging program 520. The installer then accesses the web portal 127 and has the location of the notification device registered 530. The location is then stored in the database for later access.

The installer validates a housekeeping cycle via the debug notification 540. Various pieces of information such as the location, battery level, and the identification characteristics of the device, for example, the unit ID, the mobile number, IMSI number, the original installation location, installer ID description, etc. are reported to the database. After reporting the information, the installer disables the debugging program and puts the device to sleep via a web portal.

FIG. 6 is a flowchart illustrating one embodiment of a periodic check of the system. Periodically, for example, once a day, week or month, the notification device wakes up and performs a diagnostic check of the fire extinguisher and the notification system 610. In some examples, the time (hour, minute and/or day) the notification device performs the check is the same every period. In other examples, the time is randomly selected.

The notification device checks the battery level and the pressure of the extinguisher to determine whether the fire extinguisher needs to be serviced or whether there is a leak in the extinguisher. If the check results in no issues, the notification device goes back to sleep. If the checks indicate that one or more of the tests failed, the notification device sends a message via SMS to the clearinghouse or central authority for processing 620. Afterwards, the timer resets a wake up time for the next check 630.

FIG. 7 is a flowchart illustrating one embodiment of the activation of the accelerometer. Upon activation of the accelerometer when a sensed condition meets one or more of the report criteria, such as movement of the fire extinguisher, the notification device wakes up. The microprocessor then activates the camera attached to the notification device, which records images 710. Simultaneously, the notification device begins a work cycle to determine whether the location of the fire extinguisher after activation of the accelerometer is within the boundaries of a specified area. If the fire extinguisher is within the specified boundaries, the notification device verifies a resetting of its location and sends a notification message to the clearinghouse with an initialization code 720.

If the fire extinguisher is determined to be outside the specified area, the notification device wakes up and sends a SMS/MMS message to the clearinghouse for processing to notify the parties on the notification list 720. The message also includes the video stream containing the images recorded by the camera. After sending the notification message, the notification device then resets the timer for a wake up time for the next daily check 730.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A notification device for a fire extinguisher, comprising:
a pressure sensor for coupling to the fire extinguisher for sensing pressure in the fire extinguisher;
a wireless communication transmitter for transmitting via a public cellular wireless mobile communication network;
a receiver for receiving signals to determine a location of the fire extinguisher; and
a programmed microprocessor for controlling operations of the transceiver and the receiver, wherein programming of the microprocessor configures the notification device for responding to the pressure sensor by:
upon determining when the sensed pressure meets a first report criteria related to a sudden drop of the pressure in the fire extinguisher,
initiating processing of signals through the receiver to obtain information identifying a current location of the fire extinguisher;
generating a first notification message containing an identification of the fire extinguisher and the information identifying the current location of the fire extinguisher; and
operating the wireless communication transmitter to send the first notification message through the public cellular wireless communication network addressed for delivery to signal a first party of a discharge of the fire extinguisher; and
upon determining when the sensed pressure meets a second report criteria related a slow drop or to certain amount of the pressure in the fire extinguisher;
initiating processing of signals through the receiver to obtain information identifying a current location of the fire extinguisher;
generating a second notification message containing an identification of the fire extinguisher and the information identifying the current location of the fire extinguisher; and
operating the wireless communication transmitter to send the second notification message through the public cellular wireless communication network to signal a second party to recharge the fire extinguisher;
wherein the notification device is configured to be mounted on the fire extinguisher.

2. The notification device of claim 1, wherein each notification message is sent via the public cellular wireless communication network as a Short Messaging Service (SMS) message or a Multimedia Messaging Service (MMS) message.

3. The notification device of claim 1, further comprising an accelerometer for sensing movement of the fire extinguisher.

4. The notification device of claim 1, wherein the first notification message and the second notification message each further contains data about the pressure in the fire extinguisher as sensed by the pressure sensor.

5. The notification device of claim 1, further comprising a camera for recording one or more visual images, wherein the microprocessor activates the camera to begin recording images when a sensed condition meets either the first report criterion or the second report criterion, and at least one visual image from the camera is included in a notification message.

6. The notification device of claim 1, further comprising a microphone for recording sound data, wherein the microprocessor activates the microphone to begin recording sound when a sensed condition meets either the first report criterion or the second report criterion, and the sound data is included in a notification message.

7. The notification device of claim 1, wherein the notification device performs maintenance checks of conditions of the fire extinguisher and the notification device at random time intervals.

8. A system for processing a notification regarding a fire extinguisher, the system comprising a server configured for network communication, the server containing a processor, wherein programming for the processor of the server configures the server to:
receive, through a wireless communication network, notification messages sent from a notification device of the fire extinguisher and triggered by a sensed pressure in the fire extinguisher, each received notification message containing an identification of the fire extinguisher and information identifying a current location of the fire extinguisher, the notification device generating a first of the notification messages regarding discharge of the fire extinguisher and a second of the notification messages for recharge of the fire extinguisher;
access a database to identify a party authorized to receive notice about the fire extinguisher in response to the received notification message;
evaluate the first message and send the first message from the system to signal a first party of the discharge of the fire extinguisher based on a sudden drop of the pressure; and
evaluate the second message and send the first message from the system to signal a second party to recharge the fire extinguisher based on a slow drop or on a certain amount of the pressure.

9. The system of claim 8, wherein:
the database is accessible by the processor of the server and comprises records for fire extinguishers, and
each record includes an identification of a respective one of the fire extinguishers and information identifying a location at which the respective fire extinguisher was installed, and at least one of the records identifies a party authorized to receive notice about the respective fire extinguisher.

10. The system of claim 8, wherein each received notification message includes a Short Messaging Service (SMS) message or a Multimedia Messaging Service (MMS) message.

11. The system of claim 8, wherein each received notification message further includes data about the sensed pressure as sensed by a sensor of the notification device.

12. The system of claim 8, wherein information from a received notification message sent through the communication network to equipment of an identified authorized party includes video image data obtained from a camera and sound data obtained from a microphone that are activated when a sensed condition triggered a received notification message.

13. The system of claim 8, wherein the information from the received notification message sent through the communication network to equipment of an identified authorized party includes pressure data obtained from a pressure gauge of the fire extinguisher.

14. A method, comprising the steps of:
upon determining when a sensed pressure in a fire extinguisher meets a first report criterion related to a sudden drop of the pressure in the fire extinguisher,
  initiating processing of signals through a receiver in a notification device mounted on the fire extinguisher to obtain information identifying a current location of the fire extinguisher;
  generating a first notification message containing an identification of the fire extinguisher and the information identifying the current location of the fire extinguisher; and
  operating a wireless communication transmitter of the notification device mounted on the fire extinguisher to send a first notification message through a public cellular wireless communication network addressed for delivery to signal a first party of a discharge of the fire extinguisher when the sensed pressure meets the first report criterion; and
upon determining when the sensed pressure meets a second report criterion related a slow drop or to certain amount of the pressure in the fire extinguisher:
  initiating processing of signals through the receiver to obtain the information identifying the current location of the fire extinguisher;
  generating a second notification message containing the identification of the fire extinguisher and the information identifying the current location of the fire extinguisher; and
  operating the wireless communication transmitter to send the second notification message through the public cellular wireless communication network to signal a second party to recharge the fire extinguisher.

15. The method of claim 14, wherein the method further comprises the steps of:
  upon determining the sensed pressure meets the first or the second report criterion, activating a camera associated with the fire extinguisher to begin recording one or more images; and
  sending the recorded one or more images via a notification message through the public cellular wireless communication network to a predetermined destination.

16. The method of claim 14, wherein each notification message includes a Short Messaging Service (SMS) message or a Multimedia Messaging Service (MMS) message.

17. The method of claim 14, wherein a third report criterion corresponds to movement of the fire extinguisher.

18. The method of claim 14, wherein each notification message further contains data about the sensed pressure.

19. The method of claim 14, wherein the method further comprises steps of:
  upon determining a sensed condition of the fire extinguisher meets either the first or the second report criterion, activating a microphone associated with the fire extinguisher to begin recording sound; and
  sending the recorded sound via notification message through the wireless communication network to the predetermined destination.

20. The method of claim 14, wherein the method further comprises steps of maintaining the notification device associated with the fire extinguisher by at least:
  checking a condition associated with maintenance of the notification device at random time intervals,
  determining if the condition meets a threshold for notification, and
  after determining if condition meets the threshold, sending a message containing information of the condition via the public cellular wireless communication network.

21. The method of claim 20, further comprising a step of resetting a random time to wake the notification device within the next 24 hours to repeat the steps associated with maintaining the notification device.

22. The notification device of claim 1, the programming of the microprocessor further configures the notification device for:
  prior to sending at least one of the first or second notification messages, transitioning the wireless communication transmitter from a power saving state to an on state that uses more power than the power saving state when a wake up timer signals the wireless communication transmitter to wake up; and
  resetting the wake up timer with a wake up time to signal the wireless communication transmitter to wake up after sending the first or second notification message and then transitioning the wireless communication transmitter to the power saving state.

\* \* \* \* \*